United States Patent [19]
Heimberger

[11] 3,982,988
[45] Sept. 28, 1976

[54] APPARATUS FOR MAKING SLIDE-FASTENER STRINGERS

[75] Inventor: Helmut Heimberger, Grenzach, Germany

[73] Assignee: Opti-Holding AG, Glarus, Switzerland

[22] Filed: Jan. 25, 1974

[21] Appl. No.: 436,629

[30] Foreign Application Priority Data
Jan. 26, 1973   Germany............................ 2303796

[52] U.S. Cl. ................................ 156/380; 29/408; 29/410; 156/219; 156/245; 156/272; 156/500
[51] Int. Cl.² ......................................... B29D 5/00
[58] Field of Search ................ 156/91, 92, 93, 209, 156/210, 219, 224, 242, 244, 245, 246, 272, 469, 470, 471, 500, 510, 513, 514, 553, 292, 380; 264/212, 214, 248, 259, 294, 299, 320, 252; 24/205.16 R; 29/408, 410

[56] References Cited
UNITED STATES PATENTS
3,196,196   7/1965   Burbank .............................. 29/410

3,445,915   5/1969   Cuckson et al. ..................... 29/408

FOREIGN PATENTS OR APPLICATIONS
555,696   1/1957   Italy ................................... 156/219

Primary Examiner—Caleb Weston
Attorney, Agent, or Firm—Karl F. Ross; Herbert Dubno

[57]   ABSTRACT

Slide-fastener stringers are made by extruding continuous strands of synthetic resin in a form having a plurality of cavities open on one side and defining the coupling head, shank and connecting portion of a multiplicity of coupling members which together form a coupling element adapted to be mounted along the edge of a support tape. An embossing tool is thrust into the connecting members and/or the shanks of the coupling members so as to plastically deform the thermoplastic material and produce humps along the surfaces of the coupling element which are thermally bonded to the support tape.

6 Claims, 7 Drawing Figures

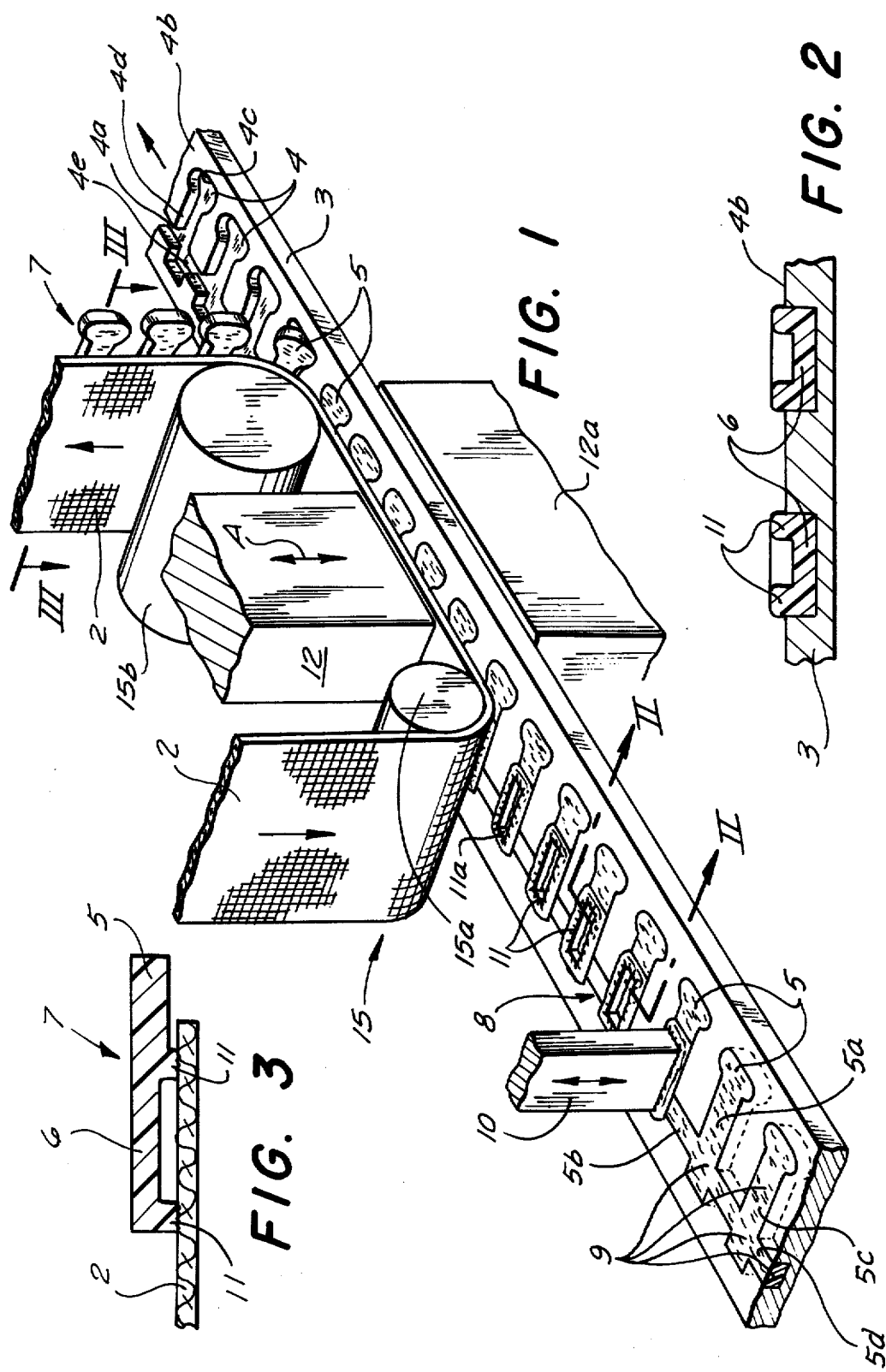

APPARATUS FOR MAKING SLIDE-FASTENER STRINGERS

CROSS-REFERENCE TO RELATED APPLICATION

The present application is related to my copending, commonly assigned, concurrently filed application Ser. No. 436,630, entitled SLIDE FASTENER.

FIELD OF THE INVENTION

The present invention relates to an apparatus for making a coupling element for a slide fastener and for making a slide-fastener stringer half. More particularly, the invention relates to the production of an improved slide fastener with greater security of attachment of the coupling element to a support tape.

BACKGROUND OF THE INVENTION

A slide-fastener stringer may comprise a pair of slide-fastener stringer halves each of which can include a fabric support tape or band and a coupling element affixed to an edge of the support tape and adapted to engage or disengage with a complementary coupling element of the other support tape. The coupling elements may be more or less identical and can have a plurality of coupling members relatively closely spaced apart along the edge of the tape and generally projecting laterally therebeyond.

Each coupling member may comprise a coupling head having formations projecting in the longitudinal direction, i.e. parallel to the edge of the tape along which they are disposed, fastening portions or shanks extending from each head transversely to this edge to overlie the tape and provide a means whereby the coupling element or member may be affixed to the tape and, in the case of continuous coupling elements, a connecting portion or ligature joining the coupling members together inwardly of the tape edge.

The coupling heads of the two coupling elements interdigitate, i.e. fit behind one another, so that the aforementioned formations engage to prevent or restrict lateral separation of the coupling elements in the absence of movement of a slider along the two coupling elements. The slider functions to bring the two coupling elements together or to slide them apart in effecting the coupling or decoupling movement.

As pointed out in the aforementioned copending application, various techniques have been proposed heretofore for securing the coupling elements to the support tapes. These techniques may generally be considered to lie in three categories. In a first category is the attachment of the coupling element by loops of thread or by stitching the coupling element to the support tape with a row of chain or lock stitches, or by fitting the coupling heads through openings in the tape or by weaving or knitting the coupling elements into the tape. A second technique is the clamping of the individual coupling heads to edge of the tape by crimping or like technique. This latter method is used most frequently where the coupling element consists of a discontinuous chain of individual coupling members. In the third technique, continuous coupling elements with a row of closely spaced heads are thermally welded or adhasively bonded to the support tape or are anchored thereto by rivets, studs, or like widely-spaced pin-like formations inserted into or formed on the extruded coupling element.

Several disadvantages have been encountered with the prior-art use of the last mentioned technique for securing coupling elements to a tape. Where the adhesive bonding or thermal welding approach has been used heretofore, it has been the customary practice to bond the entire surface of a coupling element confronting the tape to the latter. This greatly limits the flexibility of the coupling element and prevents the technique from being used effectively for fine coupling elements, i.e. coupling elements with a very close spacing of the coupling heads.

When pins, studs or rivets have been used as described, they penetrate the fabric and are formed with heads on the side of the tape opposite that from which they extend. The difficulty with this system is that considerable localized stress is applied where each stud engages the fabric and these stresses can be sufficient to break the stud or tear the fabric, thereby releasing the coupling element and rendering the stringer inoperative.

In the production of continuous coupling elements from thermoplastic synthetic resins, it has been proposed heretofore by myself and my coworkers on behalf of the present assignee, to pass the support tape through an extrusion head and to extrude a synthetic resin strand onto and around the edge of the support tape, the strand being shaped by a wheel provided with forming cavities or recesses along its periphery. It has also been proposed to continuously extrude a coupling element of thermoplastic synthetic resin by passing an endless mold member provided with a row of cavities through an extrusion head which fills these cavities and then to strip the resulting shaped strands from the endless mold thereby provided. In the first instance, the bond between the coupling element and the tape is effected by imbedding the tape in the coupling element strand with the disadvantage that shrinkage of the system occurs with a variation in the spacing and orientation of the coupling heads which cannot be tolerated when the coupling elements are to be provided on garments. In addition, the penetration of the synthetic resin varies from place to place along the textile tape and thus the quantity of synthetic resin available to fill each mold cavity may vary so that some heads are incompletely formed. In general neither of the aforementioned techniques, as practiced heretofore, is capable of the necessary provision to make fine slide fastener stringers at high rates and with good mechanical properties, i.e. high break or release resistance.

I have found, more specifically, that where the thermoplastic synthetic resin penetrates deeply into the body of the tape, the thermoplastic mass along the edge of the tape stiffens the latter while the tape fibers stiffen the thermoplastic mass so that a major part of the flexibility, desirable in a slide-fastener stringer, can be lost. Stiff slide-fastener stringers cannot be used in the garment industry.

Where attempts have been made to form the coupling element continuously and mount it upon the support tape by welding by thermal bonding techniques, the aforementioned problem has not fully been eliminated since the substantially uniform bonding of all juxtaposed surfaces of the tape and the coupling elements also brings about stiffening to an undesired degree.

OBJECTS OF THE INVENTION

It is the principal object of the present invention to provide an apparatus for making a slide-fastener stringer half in which the coupling element has uniform coupling heads of great precision or accuracy and in which the problem of stiffening mentioned previously is eliminated.

It is another object of the invention to provide an apparatus for making a slide-fastener stringer half of greater precision.

Yet another object of the invention is to provide an apparatus for the production of precision slide fasteners particularly suited for use in the garment industry whereby the aforementioned disadvantages are avoided.

SUMMARY OF THE INVENTION

These objects and others which will become apparent hereinafter are attained, in accordance with the present invention, in a method of an an apparatus for the production of a slide-fastener stringer half in which the coupling element is formed from theremoplastic synthetic resin and is thermally bonded to a support tape, preferably but not necessarily a textile web, the coupling element being formed by extrusion of thermoplastic synthetic resin material into a continuous and endless form having a mulitplicity of cavities defining the coupling members and open at one side of the form. According to this invention, a tool is pressed into the plastically deformable mass in each cavity to displace the synthetic resin material around the tool and to cause it to swell outwardly and form a mulitplicity of welding or fusion humps which are subsequently fused to the support tape with the aid of which the coupling element is withdrawn from the form.

Surprisingly, I have found that this technique achieves a dual purpose, namely, the provision of the aforementioned welding humps to which the bonding of the coupling element to the support tape can be confined so that the stiffening problems hereto encountered do not arise. The second phenomenon which results from the embossing operation effected by the tool is the displacement of the thermoplastic material into contact with all surfaces of the cavity so that each coupling member has a configuration and dimensions complementary to the use of the cavity in spite of the fact that some shrinking may have occurred in the course of the extrusion operation and partical cooling. In other words, when the synthetic resin material is forced into the mold cavity, there frequently is some shrinkage which causes portions of the thermoplastic mass to recede from the walls of the mold cavity at various locations so that the coupling elements may be of irregular shape or may not be of uniform dimensions. With the system of the present invention, whereby the tool penetrates into the thermoplastic mass, there is a further extrusion of the material, outside the extrusion head so that the thermoplastic mass is forced into contact with all of the molded surfaces and, at the same time, sufficient synthetic resin material is caused to well up adjacent the tool to form the welding humps. The volume of the tools impressed into the synthetic resin mass must thus be sufficient to compensate for the shrinkage and the desired degree of outward welling of the synthetic resin material to form the hump.

According to an important feature of the invention, as was described in the aforementioned copending application, each coupling member may comprise a coupling head projecting beyond the edge of the support tape and a fastenting portion or shank overlying the supporting tape. In addition, the connecting portions of adjacent coupling members may be joined together unitarily by a connecting portion or ligature. According to this invention, the tool is impressed into the mass of synthetic resin material representing the connecting portions or the fastening portions or both. Since the head-forming part of the mold cavity also communicates with the parts of the mold cavity defining the connecting and fastening portion, the lateral flow of synthetic resin material causes the latter to be pressed against all surfaces of the mold cavity and hence ensures uniform and precise shaping of the coupling head as well.

It is therefore an important aspect of the invention that the thermoplastic synthetic resin in the mold cavity, while in a prehardened or other plastically flowable state, is penetrated by a tool to displace the plastic material outwardly under plastic-flow or permanent-deformation conditions, whereupon some of the surfaces confronting the tape are formed with welding humps and the support tape is fused to the resulting coupling element and bonded thereto under heat and pressure. This type of thermal bonding can also be effected with the aid of ultrasonic welding devices in accordance with conventional principles. The tape is thereupon drawn away from the endless mold element to entrain the coupling element with it.

It should be noted that it is not necessary that the thermoplastic material be embossed before it has completely hardened or cooled to a temperature below its plastic-flow temperature since the tool may penetrate into the thermoplastic material with sufficient force and to a sufficient degree to effect permanent displacement or plastic deformation of even the fully hardened material. Furthermore, the present invention provides that the coupling heads may be constituted with formation, with the simultaneously embossing operation to ensure form-fitting engagement of the interdigitating coupling heads.

The bonding of the coupling element to the support tape is preferably effected, as indicated, with the aid of ultrasonic energy which is controlled so that the fusion occurs only in the region of the welding humps and it will be immediately apparent that the number and size of these humps can be determined by the volume of synthetic resin material displaced to ensure a firm bond of the coupling element with the tape but without stiffening of the system. Of course, where the problem of stiffening is not as pronounced, i.e. in dependence upon the use to which the slide fastener is to be put, it may be desirable to bond the coupling element to the tape in other areas and over surfaces beyond those afforded by the welding humps.

According to the invention, the coupling elements may be generally flat, i.e. have coupling members lying in a plane parallel to a surface of the tape to which the coupling element is bonded. In this case, the coupling element lies only along one side of the tape. Alternatively, I may provide the coupling element so that it may be folded and each coupling head defined as a bight between a pair of shanks which straddle the edge of the tape. In this case, the pressure with which the two shanks embrace the tape increases the strength of the bond and each shank may be provided along an inner space with the welding humps. The folding may be effected after one shank has been bonded to the exposed surfaces of the coupling element in the endless mold to enable the tape to withdraw the coupling element from the latter.

An important advantage of the system is that it allows a relatively simple apparatus to be used to make the slide fastener stringer half according to the invention. More particularly, the apparatus may comprise a continuously moving endless mold element, e.g. a conveyor band, with an upwardly open mold cavity. Of, course, the endless mold may also be a forming wheel if desired. The endless mold carrier may cooperate with compaction rollers for pressing the synthetic resin material into the cavity and with shaving devices to trim excess material projecting beyond the surface of the mold carrier at the side thereof at which the cavities open.

According to the invention, the apparatus is provided with at least one embossing wheel with a plurality of outward projections successively penetrating the masses of the synthetic resin materials in the respective mold cavities to displace these masses and form the weld humps while forcing the synthetic resin material plastically into all portions of the mold. The system may be combined with means for feeding the support tape into contact with the coupling element anmeans for thermoplastifying the humps to effect bonding between the support tape and the coupling elements at these humps.

According to another feature of the invention, particularly where the mold carrier is constituted as an endless band, the embossing wheel serves as an anvil for an ultrasonic tool for effecting thermal bonding substantially concurrently with the formation of the welding hump by displacement of the synthetic resin material, the sonotrode being disposed below the mold band. Furthermore, the embossing projection can here penetrate the tape if desired.

Furthermore, the embossing wheel or roller can be provided ahead of the means for feeding the support tape for the coupling element and the welding device for fusing the tape to the coupling element. In this case as well the welding device may be provided as an ultrasonic welding tool having a Sonar trode which acts upon the support tape via the latter upon the welding hump while the endless mold band or carrier consititutes the anvil. When the mold carrier is in the form of a band, moreover, it may move over another member consistituting the anvil. To maintain a substantially uniform bond between the coupling element and the support band, it has been found to be advantageous to provide downstream of the welding means one or more elastic pressing rolls, the latter operating upon the unit formed from the support tape and the coupling element whereby the coupling element can at this point remain in the endless mold carrier or can have previously been lifted therefrom.

According to another feature of the invention, the mold carrier is provided with recesses which produce the coupling members of a U configuration, the U being formed by folding each coupling member around an edge of the tape. In this case the apparatus at an upstream location provides welding means to fuse the shanks of one side of each coupling head to one surface of the tape while means is provided downstream thereof to fold the coupling members successively around the edge and then press the other shank of each coupling member against the tape via a further welding device. The mold band or carrier may also extend through the second welding device and the bending or folding apparatus so as to maintain the desired spacing of the coupling members. In this case the portion of the coupling element previously fused to the support tape may remain in the corresponding portions of the respective mold cavities.

BRIEF DESCRIPTION OF THE DRAWINGS

The above and other objects, features and advantages of the present invention will become more readily apparent from the following description, reference being made to the accompanying drawing in which:

FIG. 1 is a perspective view, drawn to a larger-than-real scale of the device, illustrating an apparatus for carrying out the method of the present invention and wherein a reciprocal device represents the embossing wheel described previously;

FIG. 2 is a detail cross section taken along the line II—II of FIG. 1 and drawn to a still larger scale;

FIG. 3 is a section taken generally along the line III—III of FIG. 1 but of a scale corresponding to that of FIG. 2;

SPECIFIC DESCRIPTION

Figure 4:
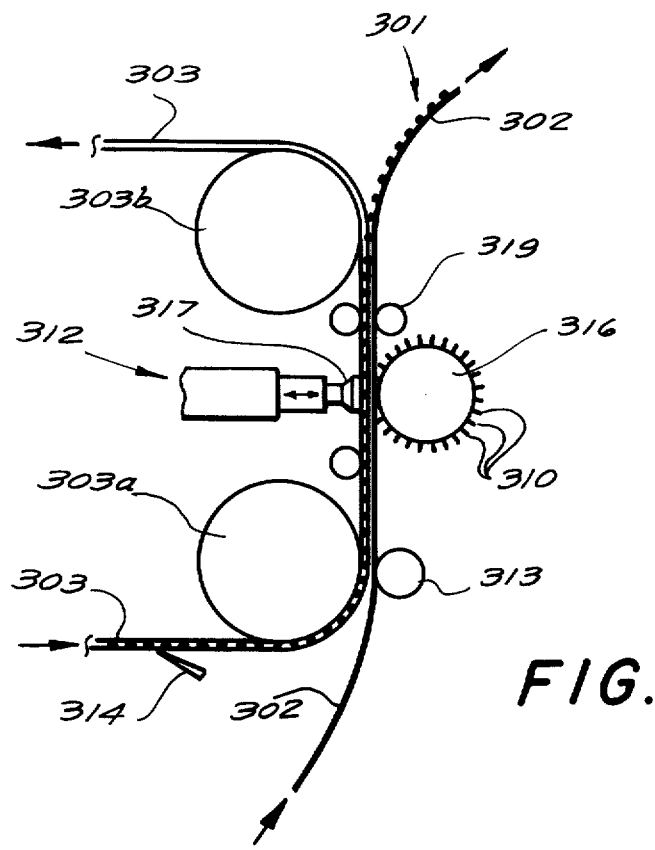
FIG. 4 is a schematic elevations view of another embodiment of the invention.

FIG. 1 illustrates the principles of the present invention in somewhat diagrammatic form. More specifically, in FIG 1 I show a coupling element 1 which is formed by extrusion in an endless mold band or strip 3 of a thermoplastic synthetic resin which is thermally bonded to a support tape 2 along an edge thereof such that the coupling heads 5 of the coupling element project laterally beyond the edge of the tape as represented in the upper right hand portion of this FIGURE.

The mold band or mold carrier 3, which is an endless strip displaced on rollers not shown by any conventional means through an extrusion head whereby synthetic resin 9 is injected in a plastic flowable state into the mold cavities 4, is shown after the resin has partly cooled and possibly shrunk away from the edges of the cavity. The cavity has a bottom 4a which is completely closed and is open along the upper surface 4b. Each mold cavity comprsies a head-forming portion 4c, a shank forming portion 4d and a groove 4e which forms the connecting portion of the coupling element between the coupling members. Consequently, each coupling member comprises a head 5, as illustrated, in shank 5a aand a connecting portion 5b joining the member with adjacent members to each side thereof. The surfaces 5c and 5d of the shank 5a and the connecting portion 5b may be embossed as desceibed in the aforementioned copending application and only diagrammatically illustrated in FIG. 1. More particularly, an embossing tool 10 may be thrust into the surface to force the synthetic resin material laterally into contact with all of the surfaces of each cavity and to cause material to well up in the form of an array of welding humps 11 along the edges of the recess 11a formed by the tool. In the system of FIG. 1, only the shank portions 5a are embossed so that the ligatures 8 between the coupling members remain unembossed although it will be apparent that the surfaces 5b may be similarly embossed as described in the copending application mentioned previously.

While only a single element is shown to be formed on the band 3 of FIG. 1 it will be apparent that it is just as convenient to form two continuous coupling elements with their heads directed in opposite directions and to bond them simultaneously to two support tapes so that, one the slide fastener stringer half of each tape is withdrawn from the band 3 as illustrated at the right hand side of FIG. 1, the two slide fastener halves can be coupled together to form a stringer.

The tape 2 is fed to the coupling element 1 after the latter has been provided with the humps 11 by a tape-fed device represented generally at 15 and including a guide roller 15a. The tape 2 passes between a sonartrode 12 which is vertically movable as represented by the arrow A and cooperates with an anvil 12 to thermally bond the coupling element to the tape using conventional principles. Ultrasonic welding of this type is fully disclosed in U.S. Pat. Nos. 3,330,026, 3,302,277, 3,333,323, and 3,378,429. The untrasonic bonding joins the tape 2 to the coupling elements at the connecting portion 7 of the shank (FIG. 3) and forms the slide fastener stringer half 7 which, upon deflection of the tape 2 around the roller 15b, draws the coupling element from the form band 3.

FIG. 2 shows how the embossing tool 10 can cause the synthetic resin material to well up over the surface 4b of the band 3 and produce the humps 11. Since the coupling elements are affixed to the support tape substantially only at these humps (FIG. 3) the stringer is uniformly flexible and since the coupling heads 5 are always precisely complements of the head portions 4c of their mold cavities, they are all of identical dimension and shape.

Figure 7:
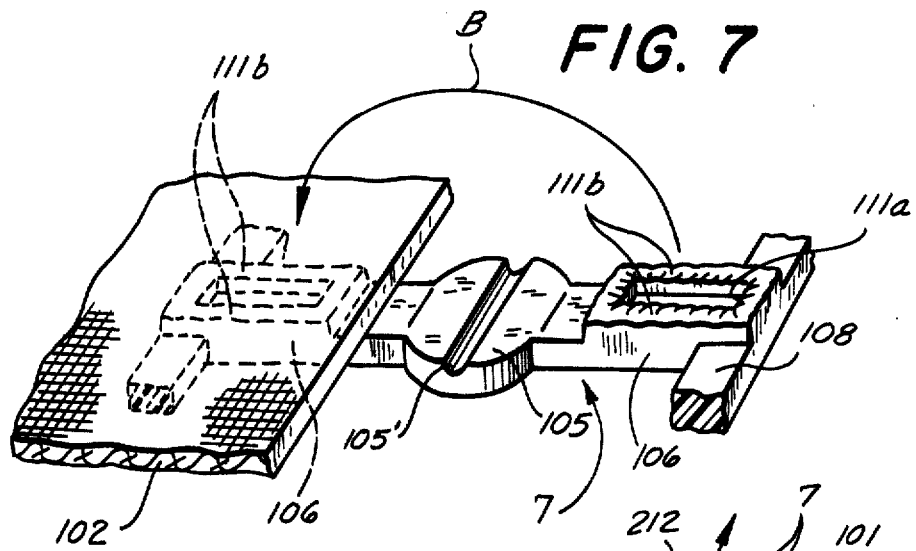
FIG. 7 is a detail view diagrammatically illustrating the region VII of FIG. 6.
Figure 6:
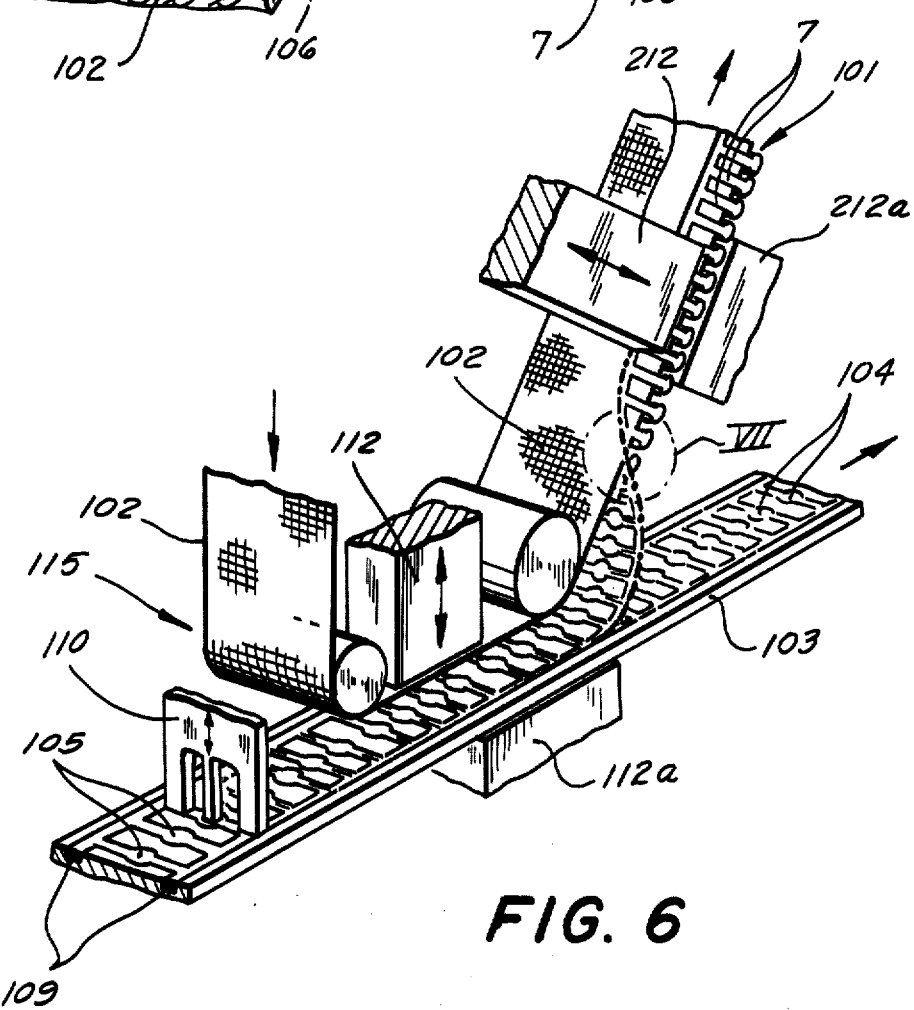
FIG. 6 is a perspective view also in a relatively large scale, showing another apparatus embodying the invention.

FIGS. 6 and 7 shown an embodiment of the invention in which the band 103 carrying the mold cavities 104 passes over an anvil 112a juxtaposed with an ultrasonic head 112 for welding the tape 102 to the coupling element 102. The difference between the device of FIGS. 6 and 7 and the device of FIGS. 1 through 3 derives from the conformation of the coupling element.

In this latter embodiment, the coupling head 105 is originally formed as a flat enlargement having a plan symmetry through which a groove 105' is formed concurrently with the embossment of the recesses 111a in each of a pair of shanks 106 extending at opposite directions from this head. Thus the upper surfaces of both shanks are provided with the humps 111b around the recesses 111a. The fastening portions or shanks 106 to either side of the head 105 are joined to the connecting portions or shanks of adjoining heads between connection portions or ligatures 108 all unitarily formed as part of the coupling element 1. The thermoplastic masses 109 within the correspondingly shaped recesses of the mold band 103 are embossed by the vertically shiftable blade 110 which is pressed into the thermoplastic material as described in connection with FIGS. 1 through 3 and may represent an embossing wheel (see FIGS. 4 and 5).

The tape-feed device 115 of this embodiment comprises rollers as described in connection with FIGS. 1 through 3 but only presses the tape 102 on to the coupling elements along one side of the head, i.e. the left-hand side as shown in FIG. 7. Consequently, only the left hand fastening portion or shanks 106 are thermally fused to the tape when the unit passes between the sonatrode 112 of the anvil 112a. Thus, the coupling element is bonded to the tape and can be drawn thereby away from the form band 103 (see FIG. 6) whereupon the right hand side of the coupling element is folded over (arrow B in FIG. 7) so that the connecting portions or shanks now straddle the edge of the tape (see upper portion of FIG. 6). The means for folding the tape also includes another sonatrode 212 and an anvil 212a which together themally bond the humps of both shanks of each coupling member to the tape. Of course, the band 104 can carry one side of the coupling element through the ultrasonic unit if desired.

Figure 5:
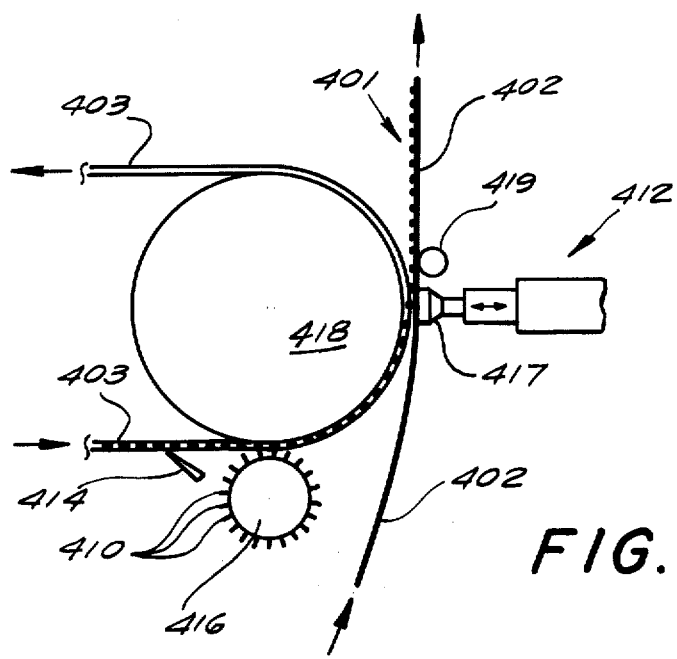
FIG. 5 is a view similar to FIG. 4 illustrating a further embodiment.

FIGS. 4 and 5 show that an apparatus for carrying out the process of the present invention can be relatively simple. Thus an endless form band 303 can pass around the rollers 303a and 303b from an extrusion device, a blade 314 skimming excess synthetic resin from the surface of this form at which the individual mold cavity opens. The form band may have the configuration shown in either FIG. 1 or FIG. 6. A pressing roller 313 cooperates with the roller 303a to urge the tape 302 against the form band carrying the coupling elements and the tape and coupling elements together are passed between an embossing wheel 316 having the embossing formation 310 (corresponding to the formations 10 and 110 previously described), which produce the humps 11 (FIGS. 2 and 3) or 111a, 111b (FIG. 7). In the embodiment of FIG. 4, however, the wheel 316 also acts as an anvil for the Sonatrode 317 of the fusion device 312 which simultaneously supplies the energy necessary to effect bonding of the humps as they are formed to the tape. A pair of pressing rollers 319 downstream of the embossing and welding stage consolidate the unit and the tape 302 is thereupon drawn away from the band 303 with the coupling element 301 affixed thereto.

In the system of FIG. 5, the embossing wheel 416 carrying the embossing formations 410, produce the humps in the coupling element while it is carried by the band 403 just behind the skimming blade 414. In this case, a single drum 418 serves to guide the band 403 from its forward pass to its return pass and supports the band against the embossing wheel 316. The tape 402 is fed tangentially to the drum 408 which here serves as the anvil for an ultrasonic traducer 417 carried by the welding device 412, an elastically biased pressing roller 419 being deposited downstream of the welding station. The slide fastener half 401, 402 being then drawn tangentially away from the band 403. In the system of FIG. 4, of course, the wheel 316 may constitute the Sonatrode and member 317 the anvil.

I claim:

1. An apparatus for making a slide-fastener stringer half comprising an endless mold carrier provided with successive cavities for molding a succession of thermoplastic synthetic resin coupling members together forming a coupling element, the cavities being open to one side and defining for each such member a coupling head, a fastening portion for mounting the member on a tape, and a connecting portion for linking each member with an adjacent member; means for embossing the synthetic resin in each cavity at said fastening portion for displacing the synthetic resin to form an array of welding humps at said fastening portion while forcing the synthetic resin into contact with all of the surfaces defining the respective cavity; and means for welding said coupling element to a support tape under heat and pressure at said welding humps, said embossing means including an embossing wheel having a plurality of projections successively insertable into said cavities from said open side, said welding means including an ultrasonic tool juxtaposed with said wheel, said wheel forming an anvil for said ultrasonic tool.

2. The apparatus defined in claim 1 further comprising elastic pressing rollers bearing against said coupling element and said tape downstream of said welding means.

3. An apparatus for making a slide-fastener stringer half comprising an endless mold carrier provided with successive cavities for molding a succession of thermoplastic synthetic resin coupling members together forming a coupling element, the cavities being open to one side and defining for each such member a coupling head, a fastening portion for mounting the member on a tape, and a connecting portion for linking each member with an adjacent member; means for embossing the synthetic resin in each cavity at said fastening portion for displacing the synthetic resin to form an array of welding humps at said fastening portion while forcing the synthetic resin into contact with all of the surfaces defining the respective cavity; and means for welding said coupling element to a support tape under heat and pressure at said welding humps, said embossing means including an embossing wheel having a plurality of projections successively insertable into said cavities from said open side, said mold carrier being an endless band and said welding means including an ultrasonic tool juxtaposed with said band, said band serving as an anvil for said tool.

4. The apparatus defined in claim 3, further comprising elastic pressing rollers bearing against said coupling element and said tape downstream of said welding means.

5. An apparatus for making a slide-fastener stringer half comprising an endless mold carrier provided with successive cavities for molding a succession of thermoplastic synthetic resin coupling members together forming a coupling element, the cavities being open to one side and defining for each such member a coupling head, a fastening portion for mounting the member on a tape, and a connecting portion for linking each member with an adjacent member; means for embossing the synthetic resin in each cavity at said fastening portion for displacing the synthetic resin to form an array of welding humps at said fastening portion while forcing the synthetic resin into contact with all of the surfaces defining the respective cavity; and means for welding said coupling element to a support tape under heat and pressure at said welding humps, said embossing means including an embossing wheel having a plurality of projections successively insertable into said cavities from said open side, said welding means bonding said tape to one fastening portion of each member and each member has two fastening portions extending in opposite directions from said head, said apparatus further comprising means for folding the other fastening portion of each member around an edge of the tape and further means for welding said other fastening portions to said tape under heat and pressure, thereby forming said members with U configurations straddling said tape.

6. The apparatus defined in claim 5, further comprising elastic pressing rollers bearing against said coupling element and said tape downstream of said welding means.

* * * * *